United States Patent [19]
Ōhuchi

[11] Patent Number: 4,735,299
[45] Date of Patent: Apr. 5, 1988

[54] ONE-WAY CLUTCH AND IMPROVED SPRING THEREFOR

[75] Inventor: Yoshio Ōhuchi, Hamakita, Japan

[73] Assignee: Yamaha Hatsudoki Kabushiki Kaisha, Japan

[21] Appl. No.: 845,547

[22] Filed: Mar. 28, 1986

[30] Foreign Application Priority Data

| Mar. 29, 1985 [JP] | Japan | 60-46522[U] |
| Jul. 5, 1985 [JP] | Japan | 60-146462 |
| Jul. 5, 1985 [JP] | Japan | 60-146463 |
| Jul. 11, 1985 [JP] | Japan | 60-104813[U] |

[51] Int. Cl.⁴ ............................................. F16D 41/06
[52] U.S. Cl. ..................................... 192/45; 192/48.6
[58] Field of Search ...................... 192/45, 45.1, 48.6

[56] References Cited

U.S. PATENT DOCUMENTS

| 1,955,475 | 4/1934 | Sorensen | 192/48.6 |
| 2,699,238 | 1/1955 | Sampatacos et al. | 192/45 |
| 3,068,978 | 12/1962 | Christenson | 192/45 |
| 3,221,850 | 12/1965 | Bacon | 192/45 |
| 4,415,072 | 11/1983 | Shoji et al. | 192/45 |

FOREIGN PATENT DOCUMENTS 1278158 10/1961 France .................................. 192/45

Primary Examiner—Alfred C. Perham
Assistant Examiner—Richard E. Chilcot, Jr.
Attorney, Agent, or Firm—Ernest A. Beutler

[57] ABSTRACT

Several embodiments of one-way clutches employing an improved, light weight and easily formed construction. In each embodiment, the one-way clutch is comprised of an outer member that defines recesses that receive wedging members and an inner member. The outer and inner members are adapted to be rotatably coupled together by the wedging members and for this purpose spring means are provided for urging the wedging members into engagement with the inner and outer member surfaces. In each embodiment, the recesses open through one side of the outer member so as to facilitate insertion of the wedging members and the biasing means and then are closed by a retainer plate. Several embodiments of light weight formed springs are employed for acting as the biasing means and, in some embodiments, the outer member is formed of a composite construction.

25 Claims, 4 Drawing Sheets

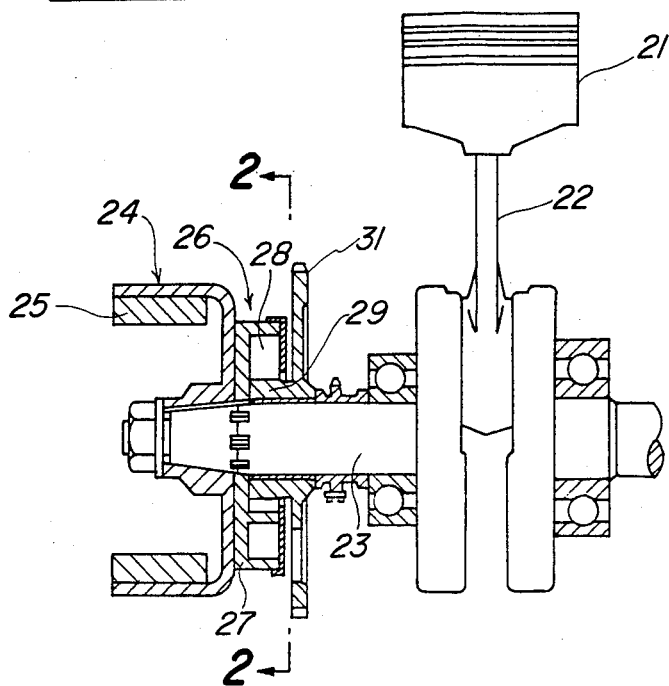
Fig-1
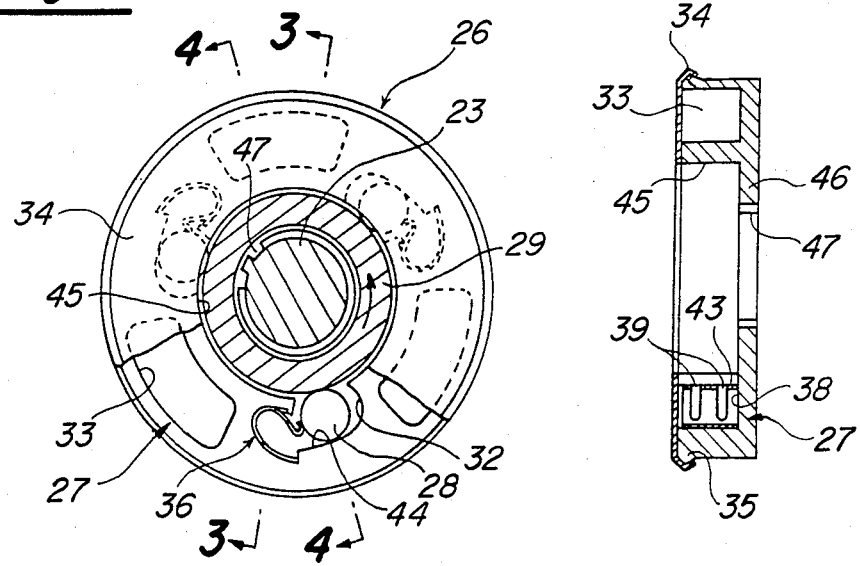
Fig-2
Fig-3

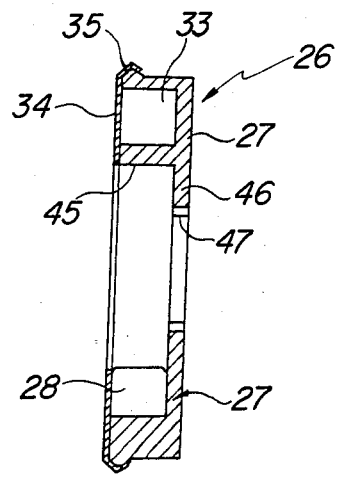
Fig-4
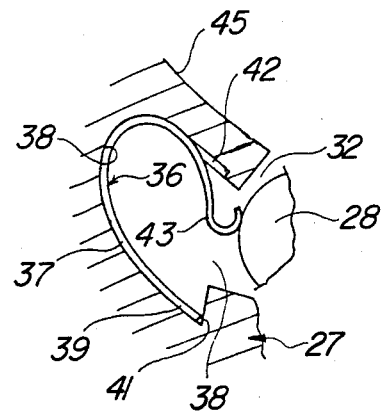
Fig-5
Fig-6
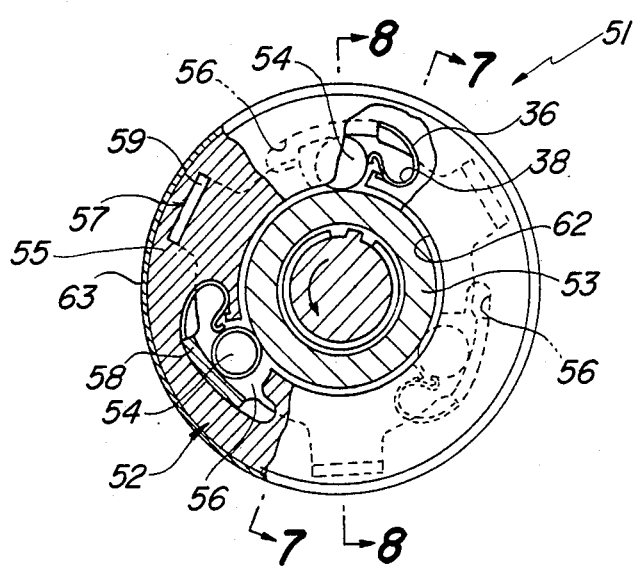
Fig-7
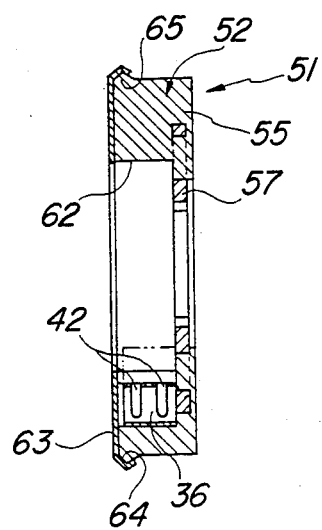

ONE-WAY CLUTCH AND IMPROVED SPRING THEREFOR

BACKGROUND OF THE INVENTION

This invention relates to a one-way clutch and more particularly to an improved, low cost, light weight one-way clutch.

One-way clutches are employed for a wide variety of uses. A one-way clutch functions, as is well known in this art, to rotatably couple a driving element to a driven element under certain conditions but also so as to permit overrunning of the driven element relative to the driving element. For example, a one-way clutch may be employed in the connection between a starter motor driven gear and an engine shaft for rotating the engine shaft when the starter motor is energized and the engine is not running. However, once the engine begins to run, the one-way clutch permits overrunning of the engine shaft relative to the starter driven gear so that the starter motor can be stopped.

One-way clutches normally use an outer member, an inner member, and wedging members that are operatively interposed between the outer and inner members for establishing a driving relationship with them under certain conditions. The wedging members are normally urged into engagement with a wedging surface of the outer member and the inner member by means of a spring arrangement. The type of spring arrangements normally used for this purpose have comprised coil compression springs which must be supported in bores formed in the outer member and which engage plungers which, in turn, act against the wedging member so as to hold it in engagement with the inner and outer member surfaces. Hence, a substantial number of parts are required by the prior art type of devices. Furthermore, due to the relatively small size, in many applications, it is very difficult to insert and install these minute components upon assembly.

It is, therefore, a principal object of this invention to provide an improved one-way clutch.

It is a further object of this invention to provide an improved and simplified biasing spring arrangement for the wedging members of a one-way clutch.

It is a yet further object of this invention to provide a one piece biasing and actuating member for exerting a biasing force on the wedging members of a one-way clutch.

In conjunction with the construction of one-way clutches as aforedescribed, the outer member is provided with recesses in which the wedging members are received. The coil springs are received in bores which intersect these recesses and thus the outer member must be assembled to include the spring and wedging members before the inner members are put in place. Obviously, this is a very complicated arrangement and requires some device for holding the wedging members against the springs while the inner member is assembled into the outer member containing the wedging members and the springs. Obviously, this is a high labor intensive work and adds considerably to the cost of these components.

It is, therefore, a further object of this invention to provide an improved and simplified arrangement which facilitates the manufacture and assembly of one-way clutches.

It is a further object of this invention to provide an improved and simplified one-way clutch construction in which the amount of labor necessary to assemble the clutch is reduced.

From the foregoing description, it should be readily apparent to those skilled in the art that the wedging of the wedging members between the inner and outer members of the one-way clutch creates significant forces on the outer member which must resist these wedging forces to avoid failure. As a result, it has been the practice to employ as the outer member a large and heavy piece formed from a very high strength material so as to absorb the forces encountered. As a result, the one-way clutches of the prior art type have been quite heavy.

Recently, it has been proposed to employ two separate pieces as the outer member of the one-way clutch. One of these pieces forms only a caging function for the wedging members and hence may be relatively light weight and may be formed from relatively low tensile strength material such as plastics and/or sintered metals. The other member actually provides the wedging surface against which the wedging member reacts and thus is formed from a higher strength material. However, the overall weight of the assembly can be reduced by this type of construction. It is, however, necessary to attach together the two members which form the wedging and caging functions and this has been done, in the previously proposed constructions, by means of separate fastening means.

It is, therefore, a still further object of this invention to provide an improved and simplified outer member for a one-way clutch which may be made up of two pieces and which does not require a separate fastening means for attaching these two pieces to each other.

SUMMARY OF THE INVENTION

A first feature of this invention is adapted to be embodied in a one-way clutch that comprises an inner member having an outer surface and an outer member that is supported in juxtaposed relationship to the inner member and which is rotatable relative to it. A wedging member is carried by the outer member and is positioned between and adapted to engage a wedging surface of the outer member and the inner member outer surface. Biasing means are provided for urging the wedging member into engagement with these surfaces for rotatably coupling the inner and outer members. In accordance with this feature of the invention, the biasing means comprises a formed member having a first portion fixed relative to the outer member, a second portion engaged directly with the wedging member and a resilient intermediate portion integrally connecting the first and second portions.

Another feature of the invention is also adapted to be embodied in a one-way clutch that comprises an inner member, an outer member and a plurality of wedging members carried by the outer member and cooperating biasing means. In accordance with this feature of the invention, the outer member is provided with axially open recesses in which the wedging members and biasing means are received for axial insertion of the wedging members and biasing means into the recesses. The recesses are then closed by a cover plate that is affixed to the outer member so as to retain the wedging members and biasing means in position.

Another feature of the invention is also adapted to be embodied in a one-way clutch having an inner member, an outer member and a biased wedging member. In accordance with this feature of the invention, the outer member is comprised of a first body of material formed of a relatively low tensile strength and defining a cavity in which the wedging member is received. An element formed from a material of higher tensile strength is received and molded into the first body of material and has a first portion that extends into the cavity and which defines a wedging surface against which the wedging member reacts and a second portion which is completely surrounded by the first body of material for non-rotatably coupling the first body and inserted element together.

BRIEF DESCRIPTION OF THE DRAWINGS

FIG. 1 is a side elevational view, with portions shown in section, of a part of an internal combustion engine having a typical environment for the invention.

FIG. 2 is an enlarged cross-sectional view taken along the line 2—2 of FIG. 1 and shows a one-way clutch constructed in accordance with a first embodiment of the invention.

FIG. 3 is a cross-sectional view taken along the line 3—3 of FIG. 2.

FIG. 4 is a cross-sectional view taken along the line 4—4 of FIG. 2.

FIG. 5 is an enlarged cross-sectional view, taken along a plane parallel to the plane of FIG. 2, showing the wedging member and its biasing arrangement.

FIG. 6 is a cross-sectional view, with portions broken away, similar to FIG. 2 and shows another embodiment of the invention.

FIG. 7 is a cross-sectional view taken along the line 7—7 of FIG. 6.

DETAILED DESCRIPTION OF THE PREFERRED EMBODIMENTS

Figure 8:
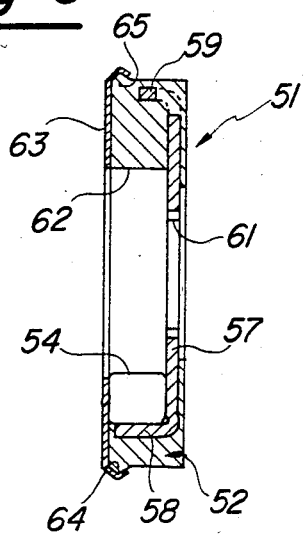
FIG. 8 is a cross-sectional view taken along the line 8—8 of FIG. 6.
Figure 9:
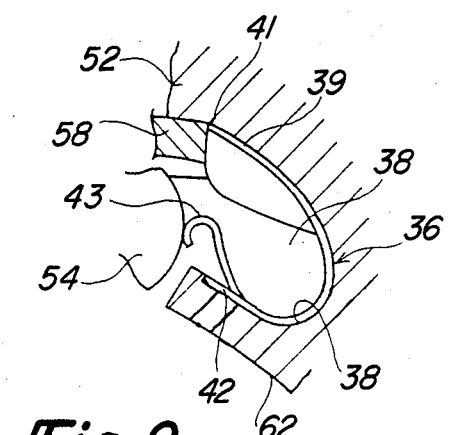
FIG. 9 is an enlarged cross-sectional view, taken along a plane parallel to the plane of FIG. 6, showing the relationship between the spring and wedging member in this embodiment.

Referring first to FIG. 1, a typical environment in which a one-way clutch constructed in accordance with the invention may be employed is shown. In this environment, the clutch is utilized for coupling a starter driven gear to an engine crankshaft for starting the engine. In FIG. 1, the engine is shown partially and includes a piston 21 that is connected by means of a connecting rod 22 to a crankshaft 23. Affixed to an outer end of the crankshaft 23 is a generally cup-shaped member 24 that carries an annular permanent magnet assembly 25 that cooperates with a winding (not shown) of a magneto generator assembly.

Interposed between the cup-shaped member 24 and the throw of the crankshaft to which the connecting rod 22 is connected, there is provided a one-way clutch, indicated generally by the reference numeral 26. The one-way clutch 26 includes an outer member 27 that is affixed, as by means of a splined connection, to the crankshaft 23. Alternatively, the outer member 27 may be affixed to the cup-shaped member 24 or formed integrally with it. Wedging members 28 are connected between the outer member 27 and an inner member 29 for rotatably connecting these members, in a manner to be described. The inner member 29 is formed integrally with or affixed for rotation with a gear 31 that is in mesh with a gear (not shown) of an electric starter motor (not shown).

When the electric starter motor turns the gear 31, the one-way clutch 26 will transmit the rotary motion to the crankshaft 23 so as to start the engine. Once the engine starts and runs under its own power, the one-way clutch 26 will permit the crankshaft 23 to rotate while the gear 31 is held stationary.

Referring now to the remaining figures, a number of embodiments of one-way clutches constructed in accordance with the invention are illustrated and will be described. The first of these embodiments appears in FIGS. 2 through 5 and the reference numerals utilized in FIG. 1 have been applied to the corresponding elements of this figure.

The outer member 27 is formed with a plurality of axially extending openings 32 in which the wedging members 28 are received. Circumferentially spaced between the openings 32 are formed a plurality of lightning openings 33 so as to reduce the overall weight of the outer member 27. It should also be noted that the openings 32 and 33 open axially through one side of the outer member 27 so that the wedging members 28 and the biasing springs, to be described, can be inserted through this open face. The open face is then closed by means of a cover plate 34 which has its ends folded over and engaged with a projection 35 of the outer member 27 so as to interlock these two members together.

The biasing springs have a construction as best shown in FIG. 5 wherein the springs are indicated generally by the reference numeral 36. In this embodiment, the springs 36 are formed from spring steel and have a leaf-like configuration consisting of an arcuate intermediate portion 37 that is received within a corresponding recess 38 adjacent the opening 32. The curved section 37 has a first integral end 39 which is engaged with a ledge 41 formed at the end of the recess 38 so as to retain this end in place.

The recess 38 ends in a section 42 from which a curved end 43 of the spring 37 departs and which engages the wedging member 28 for biasing it into engagement with a wedging surface 44 formed at the outer periphery of the recess 32 and a cylindrical outer surface of the inner member 29.

The outer member 26 has a cylindrical counterbore 45 which is spaced radially outwardly from the cylindrical outer surface of the inner member 29. At one end of the counterbore 45, there is formed an inwardly extending flange 46 in which splines 47 are formed so as to cooperate with complementary splines on the crankcraft 23 so as to rotatably couple these elements together.

When the gear 31 is rotated, the inner member 29 will rotate in a counterclockwise direction as indicated by the arrow in FIG. 2 and the wedging members 28 will be urged against the wedging surfaces 44 of the outer member 27 by this rotation and by the action of the springs 36 so as to rotatably couple the inner and outer members together. However, when the engine begins to run and the crankshaft speed exceeds that of the outer member 27, the wedging members 28 will act back against the springs 36 so as to permit relative rotation as is well known in this art.

A one-way clutch constructed in accordance with another embodiment of the invention is illustrated in FIGS. 6 through 10 and is identified generally by the reference numeral 51. As with the previously described embodiment, the one-way clutch 51 includes an outer member, indicated generally by the reference numeral 52, an inner member 53 and wedging member 54.

In this embodiment, the outer member 52 is a composite member which is made up of a first body of material 55 that forms a caging member and which may be formed from a light weight, low tensile strength material such as a molded plastic or sintered metal. The body 55 has axially extending recesses 56 in which the wedging members 54 are received. However, unlike the previously described embodiment, the wedging surfaces which cooperate with the wedging members 54 are not formed by the body 55.

Figure 10:
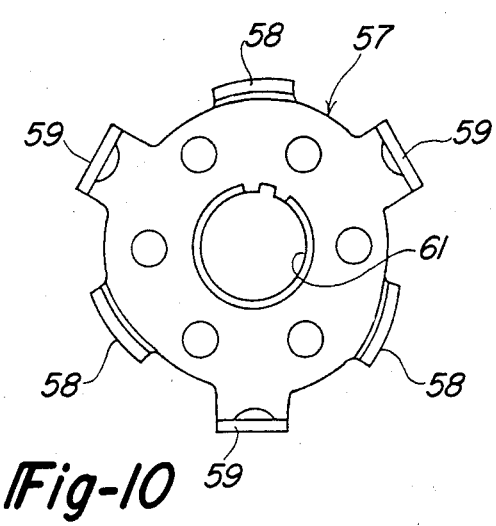
FIG. 10 is a side elevational view showing one of the components of the outer member.

In accordance with this embodiment, a wedging element 57 is embedded within the body 55 when it is formed. The wedging element 57 is formed from a relatively high tensile strength material such as steel and has a generally annular shape as shown in FIG. 10 and is formed with a plurality of outwardly extending arms 58 that open into the recesses 56 and which form the wedging surfaces. In addition, there are further provided outwardly extending arms 59 that are embedded directly in the body of material 55 so as to non-rotatably connect the wedging element 57 and the body 55.

The wedging element 57 is further formed with a splined opening 61 that cooperates with splines on the associated shaft for non-rotatably coupling the outer member 52 to the shaft. As a result of using the higher strength wedging element 57 surrounded by the lighter strength body of material 55, it is possible to provide a lighter weight clutch without sacrificing the strength.

As with the embodiment of FIGS. 1 through 5, there are formed leaf springs, indicated generally by the reference numeral 36 received in formed recesses of the body member 55 for urging the wedging members 54 into engagement with the wedging surfaces of the wedging member projections 58 and the outer surface of the inner member 53. Since these springs have the same configuration and cooperation with the supporting body member as in the previously described embodiment, their component parts have been identified by the same reference numerals and will not be described again in detail.

The outer member has a cylindrical inner surface 62 that is spaced outwardly from the outer surface of the inner member 53. In addition, the recesses 38 open axially through one side of the outer member 57 so that the wedging members 54 and springs 36 can be conveniently inserted on assembly. They are then retained in place by means of a retainer plate 63 that extends across this open face of the outer member 57 and is affixed to it by a turned over flange 64 that engages a corresponding projection 65 of the outer member body 55.

In the embodiments thus far described, the wedging members were all acted on by a formed leaf spring which served the combined function of the coil springs and plungers of previously employed arrangements. In addition to utilizing a formed leaf spring, other forms of form springs may be employed for the same purpose and FIGS. 11 through 13, 14 and 15 and 16 and 17 show such embodiments. In other regards, the construction of the one-way clutch is the same as the embodiment of FIGS. 6 through 10 and, therefore, those components of the clutch which are the same have been identified by the same reference numerals and will not be described again in detail.

Figure 11:
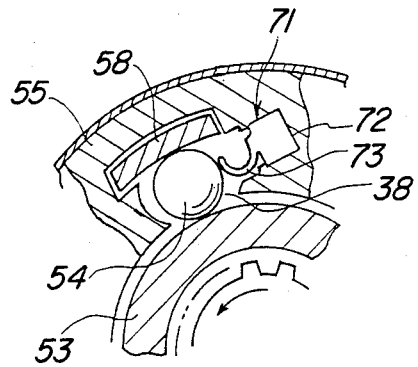
FIG. 11 is a view in part similar to FIG. 9 showing another embodiment of the invention.
Figure 12:
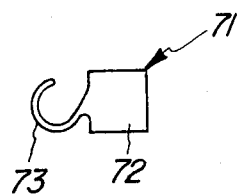
FIG. 12 is a side elevational view showing the biasing arrangement utilized in the embodiment of FIG. 11.
Figure 13:
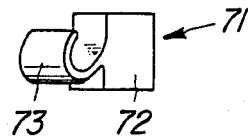
FIG. 13 is a perspective view of the biasing element.

Referring to FIGS. 11 through 13, a spring constructed in accordance with this embodiment is identified generally by the reference numeral 71. The spring 71 may be formed from a suitable material such as a plastic and is comprised of a generally rectangular or cube-shaped base section 72 that is received in a complementary shaped portion of the recess 38 of the caging member 55. In addition, there is formed an annular projection 73 which has a generally curved configuration and which engages the wedging members 54 so as to urge them into engagement with the wedging surface of the wedging member projections 58 and the outer surface of the inner member 53. Hence, a light weight easily installed and highly effective construction is employed.

Figure 14:
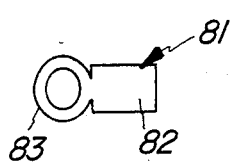
FIG. 14 is a side elevational view, in part similar to FIG. 12, showing another embodiment of biasing arrangement.
Figure 15:
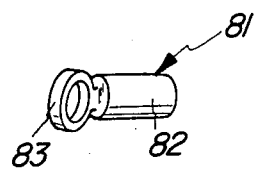
FIG. 15 is a perspective view of the biasing arrangement shown in FIG. 14.

A spring constructed in accordance with a still further embodiment of the invention is identified generally by the reference numeral 81 and is illustrated in FIGS. 14 and 15. This spring 81 may also be formed from a light weight molded material such as a plastic and has a cylindrical base portion 82 that is adapted to be received in a complementary portion of the caging member recess. A generally circular portion 83 is connected integrally to the base portion 82 and has sufficient resilience so that it can engage and act upon the wedging members as in the previously described embodiment.

Figure 16:
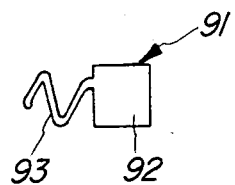
FIG. 16 is a side elevational view, in part similar to FIGS. 12 and 14, showing yet another embodiment of biasing arrangement.
Figure 17:
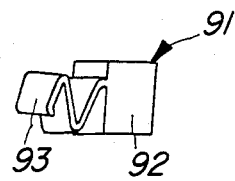
FIG. 17 is a perspective view of the biasing arrangement shown in FIG. 16.

Still another form of spring is illustrated in FIGS. 16 and 17 and is identified generally by the reference numeral 91. Like the springs 71 and 81, the spring 91 may be formed from a molded plastic material. In this embodiment, the spring 91 has a generally cube-shaped base 92 that is adapted to be received in the caging member recess and a generally zig-zag shaped spring portion 93 formed integrally with it that is adapted to engage the wedging members and hold them in engagement with the respective surfaces of the inner and outer members.

It should be readily apparent from the foregoing description that a number of embodiments of the invention have been illustrated and described each of which forms a light weight one-way clutch that is highly effective and which may be easily and conveniently assembled and which also may be made in a low cost manner. Although a number of embodiments have been illustrated and described, various changes and modifications may be made without departing from the spirit and scope of the invention, as defined by the appended claims.

I claim:

1. In a one-way clutch comprising an inner member having an outer surface, a unitary, one piece outer member supported in juxtaposed relation to said inner member and rotatable about an axis relative thereto, said out member defining a cavity extending from one side face axially into said outer member and closed at the other side thereof by a wall formed integrally with the remainder of said outer member wall, a wedging member carried by said outer member within said and positioned between and adapted to engage a wedging surface of said outer member and said inner member outer surface, and biasing means insertable axially into said cavity from one said face for urging said wedging member into engagement with said surfaces for rotatably coupling said inner and outer members, said biasing means being a formed member having a first portion fixed relative to said outer member, a second portion engaged directly with said wedging member and a resilient intermediate portion integrally connecting said first and said second portion and a cover plate fixed relative to said outer member and retaining said wedging member and said biasing means within said cavity.

2. In a one-way clutch as set forth in claim 1 wherein the biasing means comprises a leaf spring.

3. In a one-way clutch as set forth in claim 2 wherein the leaf spring resilient intermediate portion is curved about an axis extending parallel to the axis of rotation of the inner and outer members.

4. In a one-way clutch as set forth in claim 3 wherein the second portion of the leaf spring comprises a curved end engaging the wedging member.

5. In a one-way clutch as set forth in claim 1 wherein the biasing means comprises a base portion fixed in a complementary recess formed as a part of the cavity in the outer member and a resilient section.

6. In a one-way clutch as set forth in claim 5 wherein the resilient section is curved about an axis extending generally parallel to the axis of rotation of the inner and outer members.

7. In a one-way clutch as set forth in claim 6 wherein the curved section forms a complete circle.

8. In a one-way clutch as set forth in claim 5 wherein the end portion has a zig-zag shape.

9. In a one-way clutch comprising an inner member having an outer surface, a unitary one piece outer member supported in juxtaposed relation to said inner member and rotatable relative thereto, a recess formed in said outer member, a wedging member carried by said outer member within said recess and positioned between and adapted to engage a wedging surface of said outer member and said inner member outer surface, and biasing means for urging said wedging member into engagement with said surface for rotatably coupling said inner and outer members, the improvement comprising said outer member recess extending through only one face thereof and closed at the other side by a wall integral with the remainder of said outer member for insertion of said wedging member and said biasing means in an axial direction into said recess, said recesses being closed by a cover member affixed to said outer member for retaining said wedging member and said biasing means within said recess.

10. In a one-way clutch as set forth in claim 9 wherein there are a plurality of recesses, wedging members and biasing means.

11. In a one-way clutch as set forth in claim 10 wherein the recesses have a first portion adapted to receive the wedging members and a second portion adapted to receive the biasing means, said first and said second portions both extending axially through the one face of the outer member.

12. In a one-way clutch as set forth in claim 11 wherein there is a single cover member covering all of the recesses.

13. In a one-way clutch as set forth in claim 12 wherein the biasing means each comprises a formed member having a first portion fixed within the recess relative to the outer member, a second portion engaged directly with the respective wedging member and a resilient intermediate portion integrally connecting said first and said second portions.

14. In a one-way clutch as set forth in claim 13 wherein the biasing means comprises a leaf spring.

15. In a one-way clutch as set forth in claim 14 wherein the leaf spring resilient intermediate portion is curved about an axis extending parallel to the axis of rotation of the inner and outer members.

16. In a one-way clutch as set forth in claim 15 wherein the second portion of the leaf spring comprises a curved end engaging the wedging member.

17. In a one-way clutch as set forth in claim 13 wherein the biasing means comprises a base portion fixed in a complementary recess formed in the outer member and a resilient section.

18. In a one-way clutch as set forth in claim 17 wherein the resilient section is curved about an axis extending generally parallel to the axis of rotation of the inner and outer members.

19. In a one-way clutch as set forth in claim 18 wherein the curved section forms a complete circle.

20. In a one-way clutch as set forth in claim 17 wherein the end portion has a zig-zag shape.

21. In a one-way clutch comprising an inner member having an outer surface, an outer member supported in juxtaposed relation to said inner member and rotatable relative thereto, a recess formed in said outer member, a wedging member carried by said outer member within said recess and positioned between and adapted to engage a wedging surface of said outer member and said inner member outer surface, and biasing means for urging said wedging member into engagement with said surfaces for rotatably coupling said inner and outer members, the improvement comprising said outer member being comprises of a first member formed from a high tensile strength material and having a first projection extending into the recess and forming the wedging surface and a second projection and a body member formed from a molded material and defining the recess and surrounding the second projection of the first member for non-rotatably coupling the first and second members together.

22. In a one-way clutch as set forth in claim 21 wherein the first member has a first portion extending generally perpendicularly to the axis of rotation of the inner and outer members, the first and second projections extending in a generally axial direction.

23. In a one-way clutch as set forth in claim 22 wherein the outer member recess extends through one face thereof for insertion of the wedging member and biasing means in an axial direction into said recess, said recess being formed by a cover member for retaining said wedging member and said biasing means in said recesses.

24. In a one-way clutch as set forth in claim 1 wherein the cover plate has an outer peripheral flange folded over the outer member for affixing the cover plate to the outer member.

25. In a one-way clutch as set forth in claim 12 wherein the cover member has a outer peripheral flange folded over the outer member for affixing the cover member to said outer member.

* * * * *